(12) United States Patent
Tanaka et al.

(10) Patent No.: US 11,090,695 B2
(45) Date of Patent: Aug. 17, 2021

(54) METHOD FOR CLEANING OPTICAL COMPONENT AND CLEANING APPARATUS

(71) Applicant: HONDA MOTOR CO., LTD., Tokyo (JP)

(72) Inventors: Toshiyuki Tanaka, Tochigi (JP);
Satoshi Oyama, Tochigi (JP);
Kazuhide Matsuo, Tochigi (JP);
Shinichi Miyasaka, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/414,241

(22) Filed: May 16, 2019

(65) Prior Publication Data
US 2019/0358683 A1    Nov. 28, 2019

(30) Foreign Application Priority Data
May 24, 2018 (JP) .............................. JP2018-099316

(51) Int. Cl.
*B08B 7/00* (2006.01)
*B23K 26/70* (2014.01)
*B23K 26/12* (2014.01)

(52) U.S. Cl.
CPC .......... *B08B 7/0057* (2013.01); *B23K 26/123* (2013.01); *B23K 26/702* (2015.10)

(58) Field of Classification Search
None
See application file for complete search history.

(56) References Cited

U.S. PATENT DOCUMENTS

RE31,042 E * 9/1982 Clark .................... B21D 28/12
219/121.6

FOREIGN PATENT DOCUMENTS

JP         J04-9373         2/1992
KR   20050105000 A  * 11/2005  ....... G11B 11/10515

OTHER PUBLICATIONS

English Translation of KR20050105000A, accessed on Nov. 2020. (Year: 2005).*

* cited by examiner

*Primary Examiner* — Eric W Golightly
*Assistant Examiner* — Arlyn I Rivera-Cordero
(74) *Attorney, Agent, or Firm* — Rankin, Hill & Clark LLP

(57) ABSTRACT

In the method for cleaning optical components by UV ashing according to the present embodiment, while supplying humidity-controlled humidified gas, ultraviolet rays are radiated to the surface of the protective glass to remove organic matters on the surface of the protective glass. Further, in the cleaning method of the present embodiment, the humidified gas is supplied so that the humidity in the laser head during cleaning becomes 30% to 90%.

5 Claims, 9 Drawing Sheets ively melts and vaporizes.
METHOD FOR CLEANING OPTICAL COMPONENT AND CLEANING APPARATUS This application is based on and claims the benefit of priority from Japanese Patent Application No. 2018-099316, filed on 24 May 2018, the content of which is incorporated herein by reference.

BACKGROUND OF THE INVENTION

Field of the Invention

The present invention relates to a method for cleaning an optical component and a cleaning apparatus.

Related Art

In related art, there has been known a technique of decomposing organic matters adhering to a target by ultraviolet rays radiated from an ultraviolet irradiation device and performing cleaning. For example, Patent Documents 1 to 3 disclose this kind of technique.

Patent Document 1 discloses an ultraviolet irradiation device in which an object to be cleaned to which an organic contaminant adheres and a gas to be cleaned containing an organic contaminant coexists with oxygen gas, and an ultraviolet lamp which emits beam having a wavelength of 185 nm and 254 nm is disposed to face the organic contaminants and oxygen gas, and when the outputs of beam of 185 nm and 254 nm are defined as $I_{185}$ and $I_{254}$, $I_{185}/I_{254}$ is set in the range of 0.08 to 0.3.

Patent Document 1: Japanese Examined Patent Application Publication No. H4-9373

SUMMARY OF THE INVENTION

Incidentally, in the laser processing machine, since a laser of high energy density is radiated to a processing point, a non-processed material instantaneously melts and vaporizes. Therefore, contamination of organic matters in which scattering of high-temperature and high-speed spatter, generation of plasma, steam of rust preventive oil on the surface of non-processed material, and the like occur adheres to optical components such as a protective glass for protecting the focus glass. Even if the scattering spatter enters a laser head, since it is decelerated by the cutting gas discharged at high pressure from the distal end of the laser head, it is possible to greatly reduce the probability of adhesion to glass. However, a very small amount of fume may deposit on the protective glass and clouding may occur on the glass. In this case, replacement of protective glass is necessary.

A replacement work of protective glass or the like is a time-consuming work, and it is also necessary to interrupt the laser processing. Therefore, it is conceivable to decompose organic matters without detaching the optical components from the laser head, by UV ashing which irradiates the optical components such as protective glass with ultraviolet rays under a sufficient oxygen atmosphere. However, despite being in a sufficient oxygen atmosphere, in some cases, it has been found that a sufficient cleaning effect due to ultraviolet irradiation may not be exhibited, for example, when the humidity at which the air dries is low.

An object of the present invention is to provide a cleaning apparatus capable of efficiently removing organic matter adhering to the surface of an optical component by UV ashing, regardless of the humidity of the outside air.

The present invention relates to a method for cleaning an optical component for removing organic matters on a surface of an optical component (for example, a protective glass 44 to be described below) by UV ashing, the method including: radiating ultraviolet rays on the surface of the optical component while supplying humidity-controlled humidified gas to perform cleaning by UV ashing.

Therefore, it is possible to reliably generate OH radicals and stabilize the process of removing organic matters on the surface of the optical component.

It is preferable that the optical component be disposed in the laser head, and the humidified gas be supplied so that the humidity inside the laser head (for example, a laser head 40 to be described below) becomes 30% to 90%.

Therefore, it is possible to avoid a situation in which the humidity becomes 30% or less and the reaction time becomes extremely short. In addition, it is possible to prevent a degradation of a cleaning effect caused by the humidity inside the laser head becoming 90% or more and occurrence by dew condensation of water in the humidified gas. It is possible to effectively prevent occurrence of a situation in which the cleaning effect is degraded or equipment failure occurs because the humidity is not in an appropriate range.

It is preferable that the temperature of the humidified gas be controlled to be equal to or lower than the temperature inside the laser head.

As a result, it is possible to more effectively prevent the occurrence of dew condensation, by controlling and heating the water used for humidification so that the temperature is lower than or equal to the temperature inside the laser head in anticipation of the latent heat of vaporization.

It is preferable that the optical component be disposed in a laser head, a cutting gas pipe to which a cutting gas is supplied be connected to the laser head, a humidified gas pipe (for example, a humidified gas pipe 110 to be described below) configured to supply the humidified gas be connected to the cutting gas pipe, and after the end of the UV ashing, supply of the humidified gas be stopped, and scavenging of the cutting gas pipe be performed by the cutting gas.

As a result, there is no need to separately provide piping for cleaning, and the configuration for cleaning and processing can be compactly assembled. As a result, it is possible to reliably prevent occurrence of oxidation of the cut surface due to residual moisture of the cutting gas and deterioration of cutting quality.

In addition, it is preferable that the humidified gas contain oxygen or air.

Therefore, it is possible to stably perform decomposition treatment of organic matters by UV ashing, by oxygen contained in the humidified gas (or oxygen in air).

Further, the present invention provides a cleaning apparatus (for example, a cleaning apparatus 5 to be described below) which cleans an optical component of a laser processing machine (for example, a laser processing machine 1 to be described below) including: a laser head (for example, a laser head 40 to be described below) which is supported so as to be movable in XYZ directions by a moving mechanism (for example, a laser moving device 20 to be described below) above a workpiece conveying device (for example, a conveyor 10 to be described below) which conveys a workpiece (for example, a workpiece W to be described below) placed by a driving mechanism (for example, a conveyor drive motor 11 to be described below), and has an optical component (for example, a protective glass 44 to be described below) used for laser irradiation inside; and a control device (for example, a control device 70 to be described below) configured to control the driving mechanism and the moving mechanism, the cleaning apparatus including: an ultraviolet irradiation device (for example, an ultraviolet irradiation device 50 to be described below) which is disposed above the workpiece conveying device or on a side of the workpiece conveying device and installed so that a laser beam axis (for example, a laser beam axis 91 to be described below) emitted from the laser head and an ultraviolet beam axis (for example, an ultraviolet beam axis 92 to be described below) of ultraviolet ray to be radiated are parallel to each other; and a humidifier (for example, a humidifier 112 to be described below) configured to supply a humidified gas into the laser head, in which the control device performs an irradiation control for controlling the moving mechanism to irradiate the ultraviolet ray from the ultraviolet irradiation device toward the optical component in a state in which an ultraviolet irradiation port (for example, an ultraviolet irradiation port 51 to be described below) is caused to face a laser irradiation port (for example, a laser irradiation port 45 to be described below) of the laser head, and a supply control for supplying the humidified gas into the laser head by the humidifier during the irradiation control.

Therefore, it is possible to reliably generate OH radicals and stabilize the process of removing organic matters on the surface of the optical component.

According to the cleaning apparatus of the present invention, it is possible to efficiently remove organic matters adhering to the surface of an optical component by UV ashing, regardless of the humidity of the outside air.

DETAILED DESCRIPTION OF THE INVENTION

Figure 1:
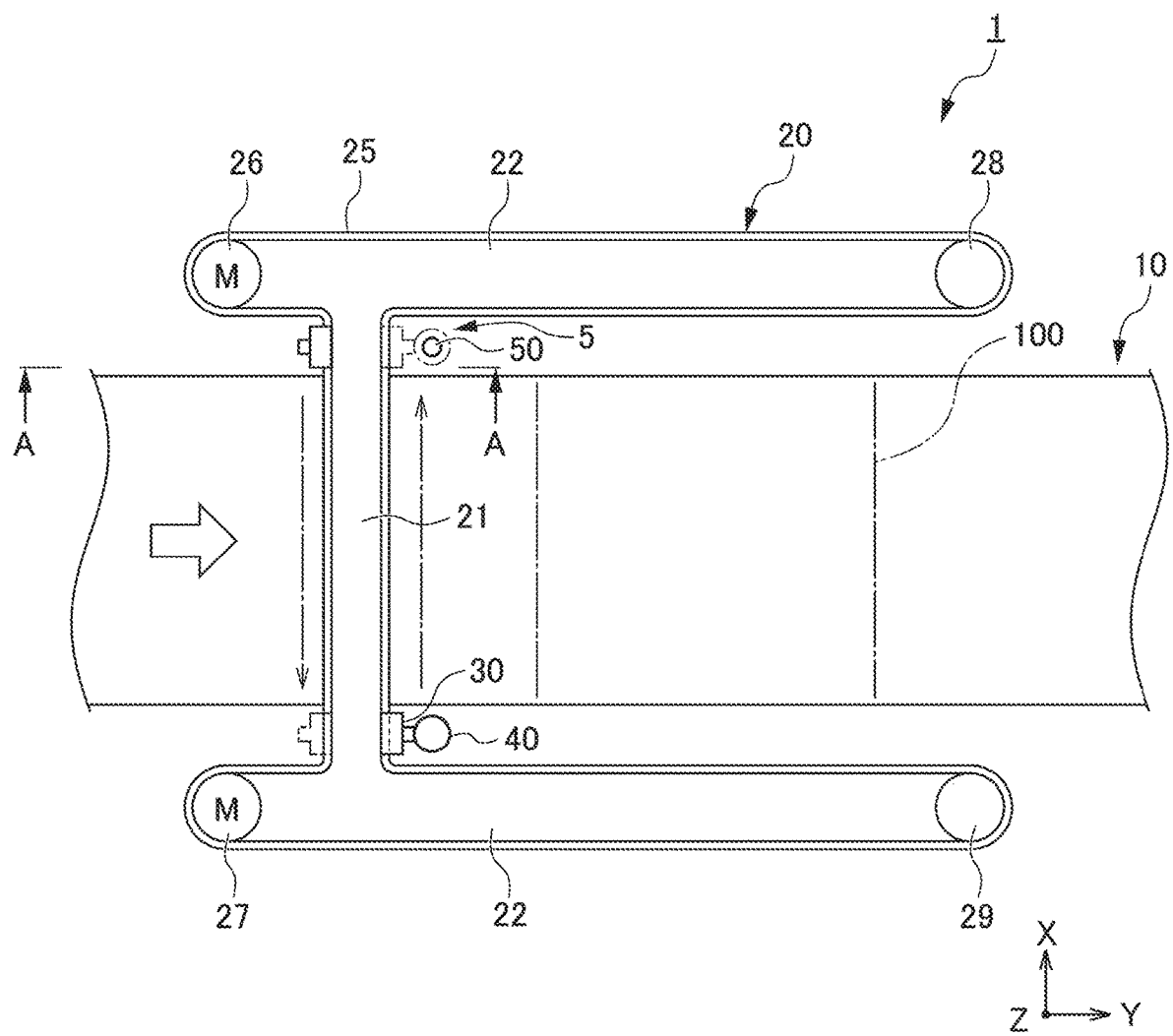
FIG. 1 is a plan view schematically illustrating a laser processing machine to which a cleaning apparatus according to an embodiment of the present invention is applied.
Figure 2:
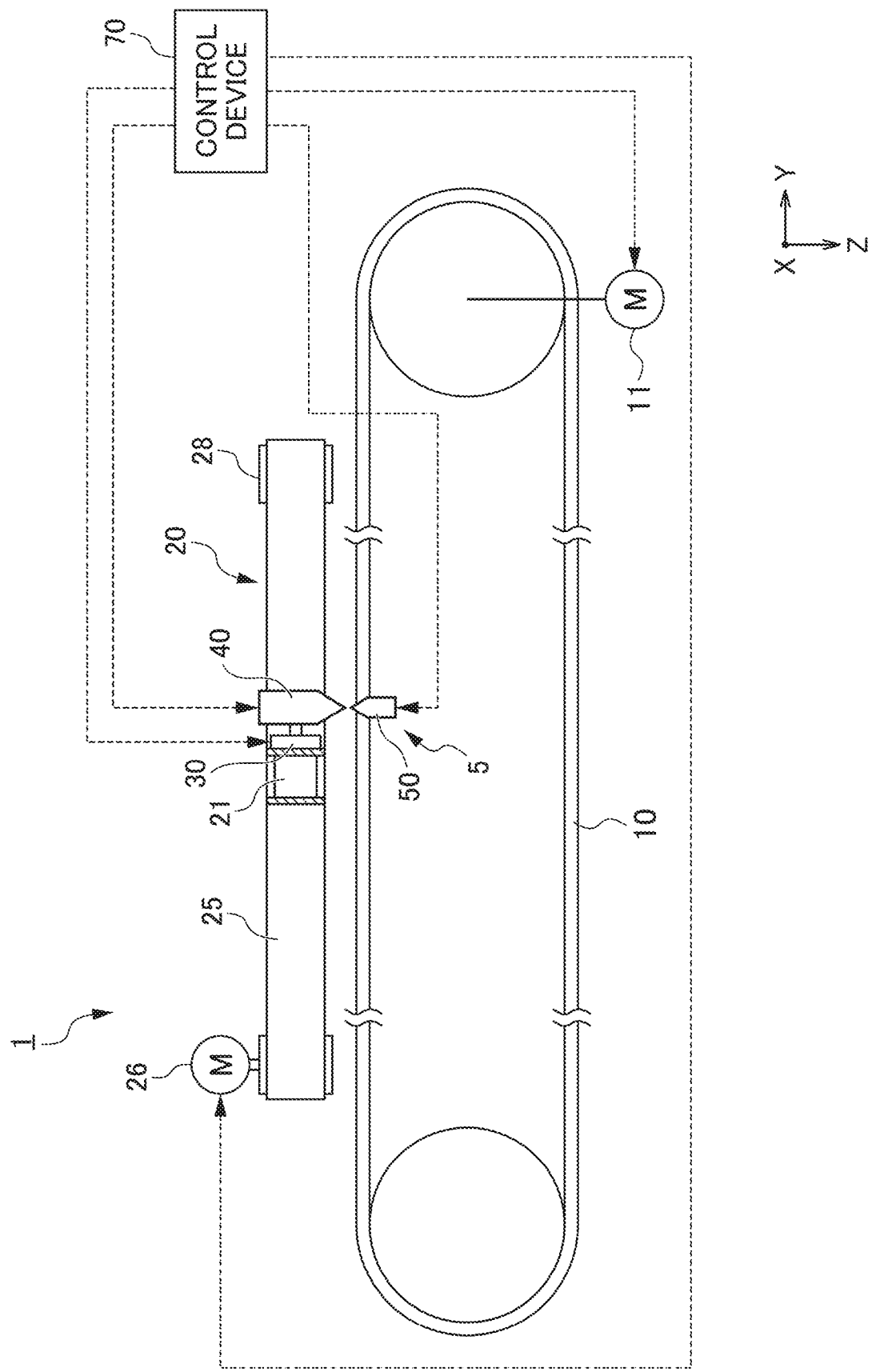
FIG. 2 is a side view schematically illustrating the laser processing machine of the present embodiment.

Hereinafter, preferred embodiments of the present invention will be described with reference to the drawings. FIG. 1 is a plan view schematically illustrating a laser processing machine 1 to which a cleaning apparatus 5 according to an embodiment of the present invention is applied. FIG. 2 is a side view schematically illustrating the laser processing machine 1 of the present embodiment, and is a cross-sectional view taken along line A-A in FIG. 1.

The laser processing machine 1 illustrated in FIGS. 1 and 2 is used for a laser blanking system which cuts (blanks) a workpiece W with lasers in accordance with different shapes depending on objects to be processed and sends them to a subsequent process. The workpiece W (not illustrated in FIGS. 1 and 2) to be processed by the laser processing machine 1 is, for example, a steel plate of a side panel for an automobile, or the like.

First, an overall configuration of the laser processing machine 1 will be described. The laser processing machine 1 of the present embodiment mainly includes a conveyor 10, a laser moving device 20, a laser head 40, and a cleaning apparatus 5.

The conveyor 10 is a workpiece conveying device that conveys the workpiece W from an upstream side to a downstream side (a Y-axis direction in FIG. 1). The conveyor 10 is constituted by an endless belt that rotates by the driving force of a conveyor drive motor 11. In the present embodiment, the workpiece W that has passed through an uncoiler and a leveler (both of which are not illustrated) is placed on the upper surface of the conveyor 10 and is conveyed to the processing position.

The laser moving device 20 is a moving mechanism that supports the laser head 40 so as to be movable in the XYZ direction above the conveyor 10.

The laser moving device 20 of the present embodiment includes a first frame 21 extending in a direction (an X-axis direction) orthogonal to a conveyance direction of the conveyor 10, a pair of second frames 22 which supports the conveyor 10 so as to be movable in the conveyance direction (a Y-axis direction), an endless belt 25 wound around the side surfaces of the first frame 21 and the second frame 22, servo motors 26 and 27 which drive the endless belt 25, pulleys 28 and 29 rotating on the inside of the endless belt 25, and an elevating mechanism 30 fixed to the endless belt 25 and supporting the laser head 40.

The endless belt 25 is wound in a substantially H shape in a plan view, and by combination of the rotation of the servo motors 26 and 27, the laser head 40 held by the elevating mechanism 30 can move in a planar direction (an XY direction). In the present embodiment, the laser processing using the laser head 40 is performed inside an area 100 indicated by a chain line. It is to be noted that the area 100 is an example, and the area in which the laser processing is performed is not limited to that range.

For example, by controlling the two servo motors 26 and 27 at the same speed with the same rotational direction, the endless belt 25 moves in the same direction as the rotation direction of the servo motors 26 and 27, and the laser head 40 held by the elevating mechanism 30 moves in the X-axis direction. At this time, the first frame 21 does not move in the Y-axis direction due to the equilibrium of rotational speeds of the two servo motors 26 and 27. Further, when moving the first frame 21 in the Y-axis direction, the servo motor 26 (or the servo motor 27) on one side is rotated clockwise at a predetermined speed, and the servo motor 27 (or the servo motor 26) on the other side is rotated counterclockwise at the same predetermined speed. Therefore, the laser head 40 held by the elevating mechanism 30 moves in the Y-axis direction depending on the rotation direction of the servo motors 26 and 27. At this time, the laser head 40 does not move in the X-axis direction due to the equilibrium of the predetermined speed. It is also possible to move the laser head 40 in the Y-axis direction, while moving in the X-axis direction by controlling the rotation direction and rotation speed of the servo motors 26 and 27.

The movement of the laser head 40 in a vertical direction (a Z direction) is performed by the elevating mechanism 30. The servo motors 26 and 27 and the elevating mechanism 30 allow the laser head 40 to move in three dimensions (XYZ directions).

Next, the configuration of the laser head 40 will be described. The laser head 40 radiates a laser beam to the workpiece W placed on and conveyed by the conveyor 10 to cut and process the workpiece in a preset shape. In cutting using the laser, the workpiece (a steel plate) W is locally melted by a laser, and the molten metal is eliminated by $N_2$ as a cutting gas, thereby fusing the workpiece W without oxidation.

Figure 3:
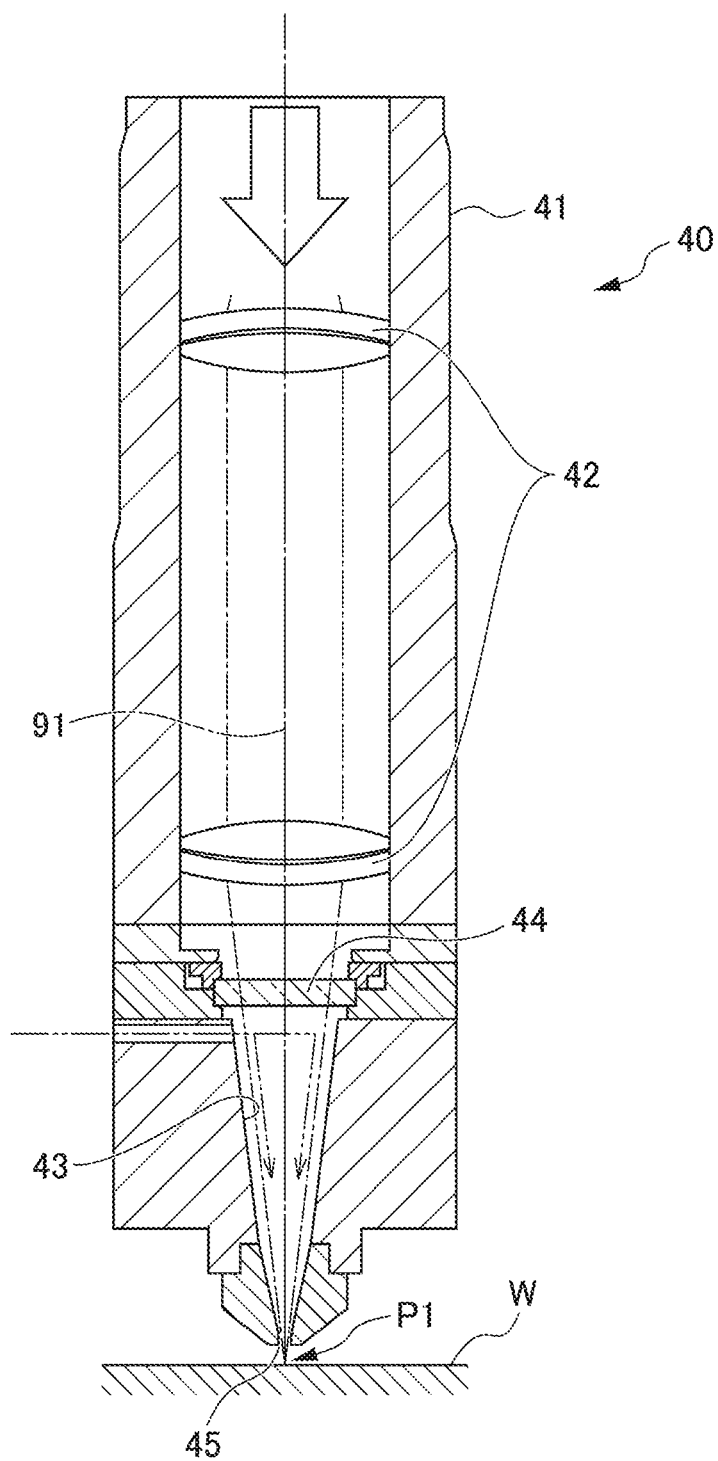
FIG. 3 is a cross-sectional view schematically illustrating an internal configuration of a laser head of the present embodiment.

FIG. 3 is a cross-sectional view schematically illustrating an internal configuration of the laser head 40 of the present embodiment. In FIG. 3, the laser focused by a focus lens 42, which will be described later, is schematically illustrated by a one-dot chain line, and the flow of $N_2$ as a cutting gas is schematically illustrated by a two-dot chain line.

The laser head 40 of the present embodiment includes a main body 41 having a laser irradiation port 45 formed at a distal end thereof, the focus lens 42 disposed inside the main body 41, a flow path 43 for guiding $N_2$ to a processing target, a protective glass 44 for protecting the focus lens 42, and a light source (not illustrated) for supplying a laser to the focus lens 42 inside the main body 41.

The focus lens 42 is an optical system that focuses the laser on the processing target (a cut portion). The flow path 43 is formed on the same axis as a laser beam axis 91 collected by the focus lens 42. Laser irradiation (one-dot chain line of FIG. 3) is performed, while causing the $N_2$ gas (two-dot chain line of FIG. 3) supplied from a gas supply source (not illustrated) to flow through the flow path 43. The laser head 40 moves along a preset moving locus, while keeping the distance between the laser head 40 and the processing point P of the workpiece W constant, thereby cutting the workpiece W into a desired shape.

The protective glass 44 prevents adhesion of spatter, fumes, impurities and the like floating up from the surface of the steel material to prevent the occurrence of failures such as deterioration of light condensing properties due to contamination of the focus lens 42, degradation of cutting ability, and melting loss of the focus lens 42 itself. The protective glass 44 is disposed between the focus lens 42 and the processing target. As the protective glass 44 of the present embodiment, a flat plate made of quartz glass is used, and an antireflection coating is applied to the surface to suppress energy loss due to surface reflection.

The cleaning apparatus 5 irradiates the protective glass 44 with ultraviolet ray while laser irradiation is not performed, and performs cleaning processing of the protective glass 44. The cleaning apparatus 5 of the present embodiment includes an ultraviolet irradiation device 50 and a control device 70.

The ultraviolet irradiation device 50 will be described. As illustrated in FIG. 1, the ultraviolet irradiation device 50 of the present embodiment is disposed on the side of the conveyor 10 that does not overlap the conveying path of the workpiece W. When the cleaning processing of the protective glass 44 using the ultraviolet irradiation device 50 is performed, the laser head 40 moves to a cleaning position (a position illustrated by the chain line of FIG. 1) by the laser moving device 20. In a state in which the laser head 40 is moved to the cleaning position, ultraviolet rays from the ultraviolet irradiation device 50 are radiated to decompose contamination adhering to the protective glass 44.

In the present embodiment, the ultraviolet irradiation device 50 in which a xenon Hg lamp having an ultraviolet wavelength of 254 nm (a range of 200 to 600 nm), a rating of 280 VA and an ultraviolet illuminance of 3,500 mW/cm$^2$ is set as a light source is used. The xenon Hg lamp has many long wavelength UV components and can transmit optical fibers, which is preferable in terms of mounting in equipment.

Figure 4:
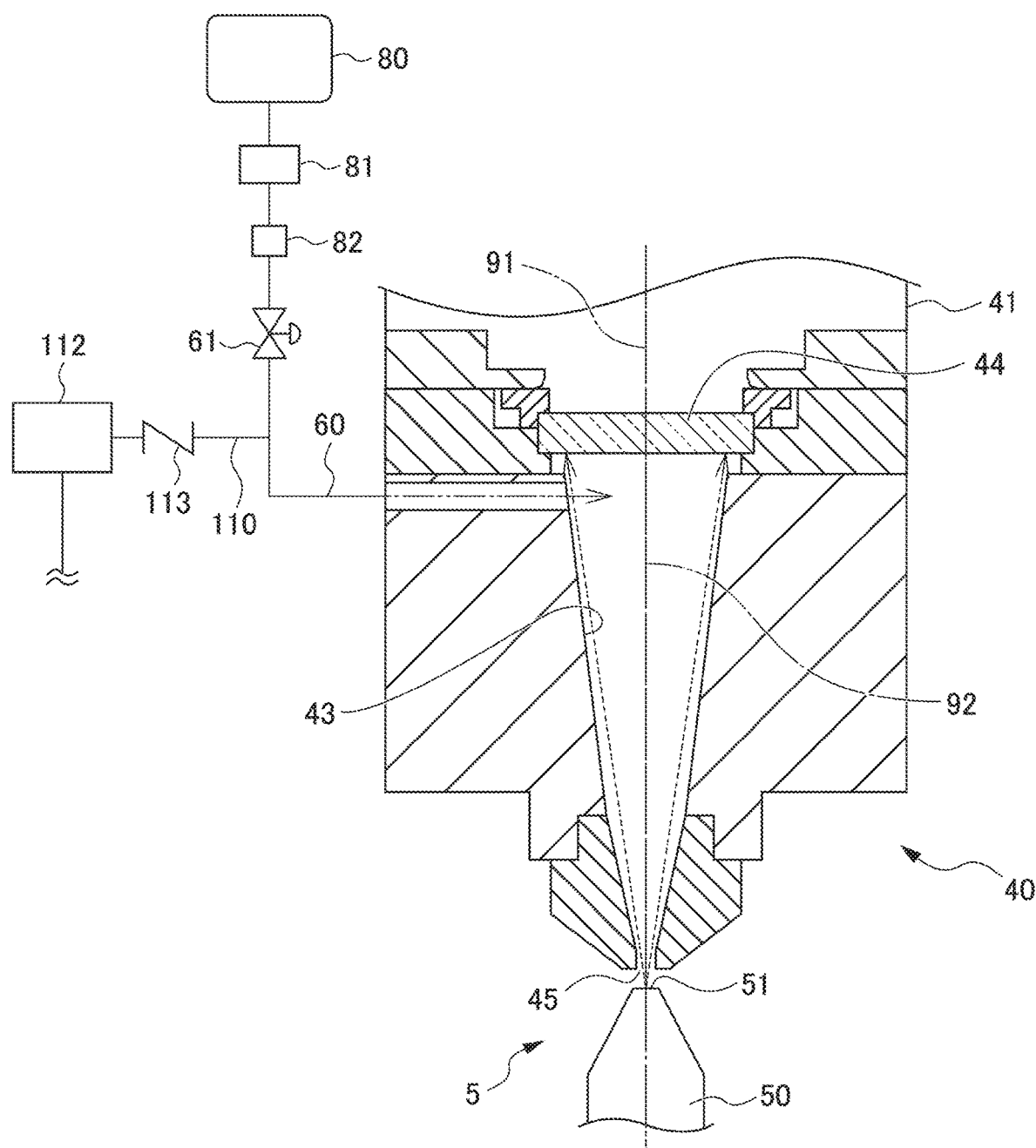
FIG. 4 is an enlarged cross-sectional view schematically illustrating an aspect in which the laser head of the present embodiment moves to a cleaning position facing an ultraviolet irradiation device.

FIG. 4 is an enlarged cross-sectional view schematically illustrating a state in which the laser head 40 of the present embodiment moves to a cleaning position facing the ultraviolet irradiation device 50. In FIG. 4, the ultraviolet ray from the ultraviolet irradiation device 50 is schematically illustrated by a broken line, and the flow of the humidified gas is schematically illustrated by a two-dot chain line.

As illustrated in FIG. 4, at the cleaning position, the laser irradiation port 45 of the laser head 40 is in a state of facing the ultraviolet irradiation port 51 of the ultraviolet irradiation device 50, and there is a positional relation in which the laser beam axis 91 and the ultraviolet beam axis 92 substantially coincides with each other.

In the laser head 40 of the cleaning position, the position of the ultraviolet irradiation port 51 of the ultraviolet irradiation device 50 is located at the same position as the processing point (the processing focus) P of the workpiece W or on the side closer to the protective glass 44 than that position. The laser head 40 is controlled to come to the cleaning position by the laser moving device 20.

When reaching the cleaning process start timing to be described later, the control device 70 moves the laser head 40 to the cleaning position by the laser moving device 20 and also supplies the humidified gas to the flow path 43 by a humidifier 112 to be described later (two-dot chain line in FIG. 4). Further, the control device 70 discharges $N_2$ to the outside of the laser head 40 and sends oxygen and water into the flow path 43.

In the cleaning process, ultraviolet ray is radiated, while causing the humidified gas to flow through the flow path 43 of the laser head 40. The humidified gas is a fluid containing $H_2O$ and $O_2$. A cutting gas pipe 60 for supplying $N_2$ is connected to the flow path 43 of the laser head 40, and a humidified gas pipe 110 for supplying the humidified gas to the flow path 43 is connected in the middle of the cutting gas pipe 60.

In the present embodiment, an upstream end portion of the cutting gas pipe 60 is connected to a $N_2$ tank/vaporizer 80. Between the $N_2$ tank/vaporizer 80 and the laser head 40 in the cutting gas pipe 60, a $N_2$ gas pump 81, a filter 82, and an electromagnetic valve 61 are disposed in order from the upstream side to the downstream side. The humidified gas pipe 110 is connected between the electromagnetic valve 61 and the laser head 40 in the cutting gas pipe 60. In the humidified gas pipe 110, a humidifier 112 and a check valve 113 are disposed in order from the upstream side to the downstream side in a direction in which the humidified gas flows.

Switching between the $N_2$ gas and the humidified gas is mainly performed by turning on and off the electromagnetic valve 61 and the humidifier 112. The electromagnetic valve 61 is electrically connected to the control device 70, and the opening/closing timing is controlled by the control device 70.

The control device 70 is a computer including a CPU, a memory, a storage device, and the like, and is electrically connected to each configuration of the laser processing machine 1. The control device 70 controls the movement of the laser head 40 by the aforementioned laser moving device 20, the laser irradiation, the conveyance of the conveyor 10, the cleaning process by the ultraviolet irradiation device 50, and the like.

Figure 5:
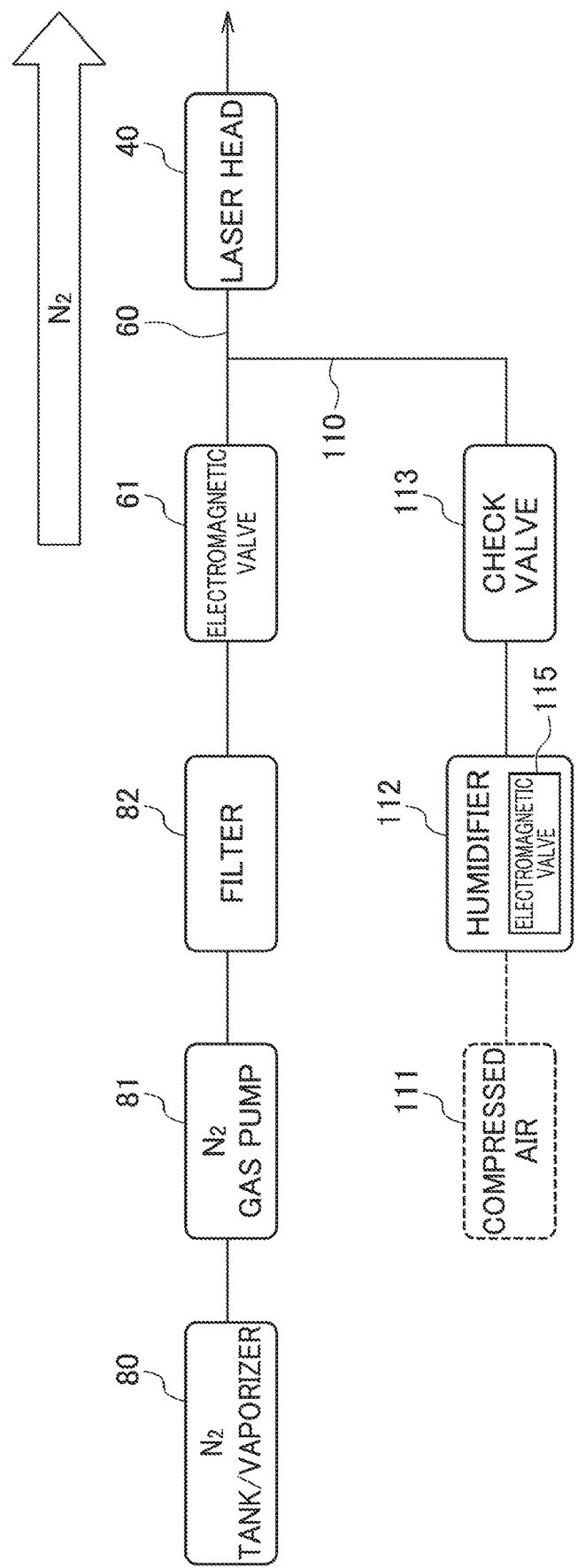
FIG. 5 is a functional block diagram schematically illustrating an aspect in which $N_2$ is supplied at the time of laser processing using the laser processing machine of the present embodiment.

FIG. 5 is a functional block diagram schematically illustrating an aspect in which $N_2$ is supplied at the time of the laser processing using the laser processing machine 1 of the present embodiment. In the process of cutting the workpiece W at the time of laser processing, the electromagnetic valve 61 is opened, and $N_2$ gas as the cutting gas is supplied to the flow path 43 in the laser head 40. Further, in the present embodiment, the humidifier 112 has an electromagnetic valve 115, and a control of closing the electromagnetic valve 115 is performed at the time of laser processing.

Figure 6:
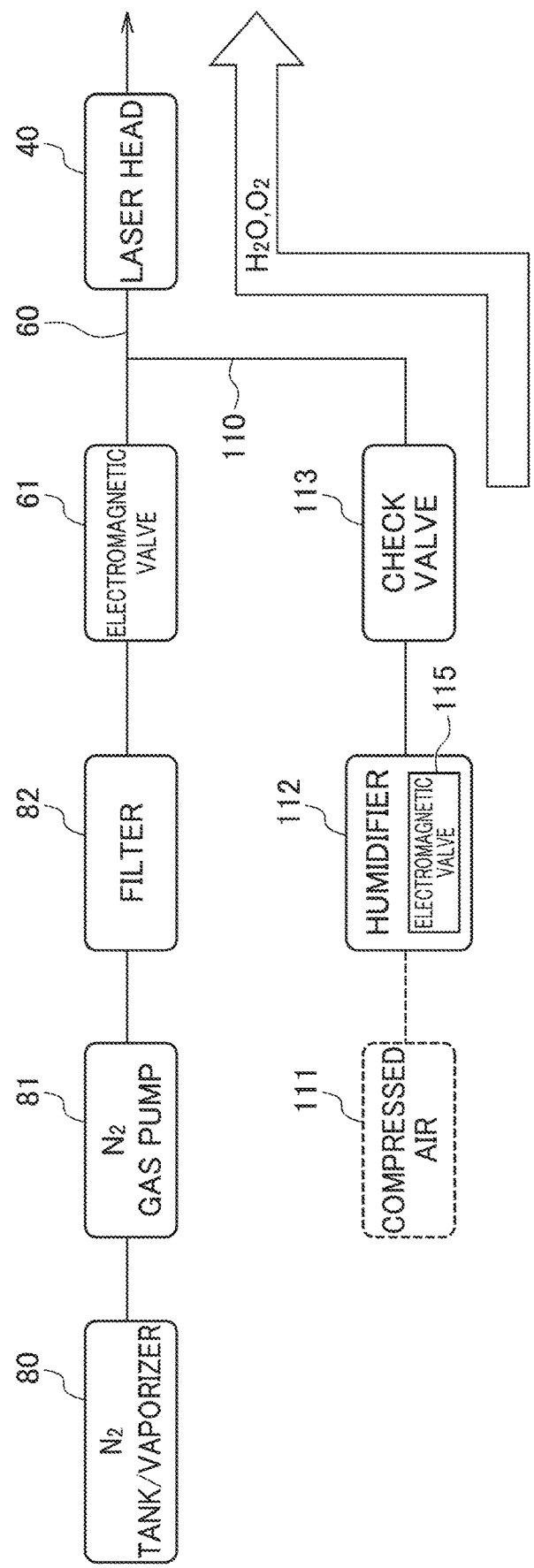
FIG. 6 is a functional block diagram schematically illustrating an aspect in which $H_2O$ and $O_2$ are supplied at the time of cleaning of the laser processing machine of the present embodiment.

FIG. 6 is a functional block diagram schematically illustrating a state of supplying $H_2O$ and $O_2$ at the time of cleaning the laser processing machine 1 of the present embodiment. In the cleaning process using the cleaning apparatus 5, the electromagnetic valve 61 is closed and supply of humidified gas by the humidifier 112 is started. In the present embodiment, the humidifier 112 opens the electromagnetic valve 115 and humidifies the compressed air supplied from a compressed air supply equipment 111 in a factory or the like. As the humidifier 112, for example, a hollow fiber membrane type is used. The humidified compressed air is supplied from the humidified gas pipe 110 into the laser head 40 through the cutting gas pipe 60, and sufficient water and oxygen are sent into the flow path 43 of the laser head 40.

The humidity of the humidified gas supplied by the humidifier 112 is set in consideration of the humidity upper limit and the reaction time capable of preventing dew condensation on the basis of the measurement result of the piping, the temperature/pressure change of the laser head 40, and the like. In the present embodiment, humidity setting of the humidifier 112 is performed in consideration of a humidity reduction due to the pressure drop of the humidified gas when reaching the laser head 40, a condensation occurrence due to temperature change, and a humidity reduction. The pressure drop is taken into consideration, for example by way of a pipe arrangement. In the present embodiment, the flow rate and the like are adjusted so that the humidity falls within the range of 30% to 90% as a range in which the reaction time is not extremely short and the dew condensation can be prevented. Further, the temperature is adjusted by the humidifier 112 or an external device to match the outside air temperature.

The effect of supplying the humidified gas will be described. In the UV ashing (cleaning using the ultraviolet irradiation), the process can be divided into an OH generation step of generating hydroxyl radical (OH radical) from oxygen and water by UV, and a decomposition step of decomposing an organic matter.

In the OH generation step, first, as represented in the formula (1), the OH radical is generated from oxygen and water by UV.

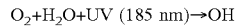

$$O_2 + H_2O + UV\ (185\ nm) \rightarrow OH \qquad \text{Formula (1)}$$

In the decomposition step, as represented in Formula (2), the OH radical oxidizes the organic matter and is discharged as a gas.

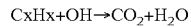

$$CxHx + OH \rightarrow CO_2 + H_2O \qquad \text{Formula (2)}$$

The oxidizing power of OH radicals is very high, reacts with other molecules after OH radical generation and decomposes in several μs. Therefore, in order to ash the specific site, it is necessary to directly irradiate the target surface with UV to directly generate OH radical on the surface. Further, from the reaction formulas (1) to (2), it is understood that decomposition of organic matters by UV ashing is limited by the generation amount of OH radicals. In addition, parameters for generation of OH radicals can be narrowed down to a UV intensity, a moisture content, and an oxygen content. When water is deficient in the reaction, since the excited oxygen is reduced to oxygen, there is a risk of degradation of the generation ability of OH radicals, and it is preferable that water be sufficient.

In the present embodiment, a check valve 113 is disposed in the humidified gas pipe 110. Even if both $N_2$ and humidified gas are supplied due to failure or the like, setting is made so that the supply pressure of the $N_2$ gas is preponderantly higher than the supply pressure of the humidified gas such that the humidified gas is not supplied into the laser head 40. The pressure in the laser head 40 is relatively lower than the pressure in the humidified gas pipe 110, and the inside of the laser head 40 is connected to the atmosphere.

A fail-safe mechanism is achieved in which the check valve 113 operates by the differential pressure inside the humidified gas pipe 110 and the laser head 40 and only the $N_2$ gas is supplied to the laser head 40 at the time of laser processing. Further, in the cleaning process, since the electromagnetic valve 61 is closed, a configuration in which moisture does not reach the upstream side of the cutting gas pipe 60 is provided.

After completion of the cleaning process, the operation of the humidifier 112 is stopped by closing the electromagnetic valve 115 or the like, and the electromagnetic valve 61 of the cutting gas pipe 60 is opened to perform purging with the $N_2$ gas, thereby discharging the humidified gas remained in the cutting gas pipe 60 to the outside.

As described above, in the cleaning apparatus 5 of the present embodiment, since the humidified gas sufficiently containing oxygen and water is supplied by the humidifier 112 at the time of ultraviolet irradiation in the cleaning process, it is possible to perform cleaning of the protective glass 44 by UV ashing with high efficiency. In a state in which the laser head 40 is located at the cleaning position, ultraviolet rays are radiated by the ultraviolet irradiation device 50 for a predetermined time (a broken line of FIG. 4), and the decomposition treatment of contamination of organic matter of the protective glass 44 is performed to restore the transmittance of the protective glass 44. The time for ultraviolet irradiation is, for example, 45 minutes.

Figure 7:
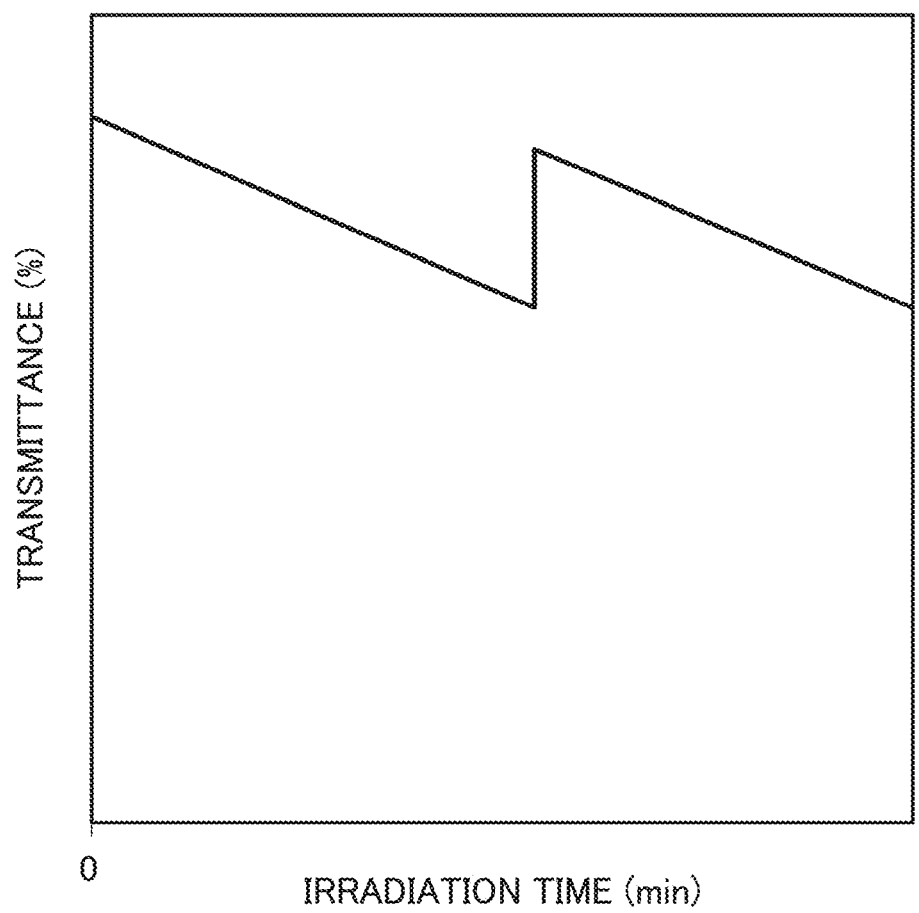
FIG. 7 is a graph illustrating a relation between an irradiation time and the transmittance of the protective glass illustrating the timing at which the cleaning treatment using the ultraviolet irradiation device of the present embodiment is performed.

The control device 70 of the present embodiment controls the timing of the cleaning process so that the cleaning process of the protective glass 44 using the ultraviolet irradiation device 50 is performed by laser irradiation for a period of time (a non-operating time) during which the workpiece W is not cut. Although the transmittance decreases as the laser irradiation time increases, the glass transmittance is restored by cleaning using the ultraviolet irradiation device 50 at the time of non-operating of the equipment. For example, as illustrated in FIG. 7, the control device 70 performs the cleaning process at an appropriate timing during laser processing so that the transmittance of the protective glass 44 becomes equal to or greater than a predetermined reference. As a result, the transmittance of the protective glass 44 is restored by cleaning before reaching the lifetime. As described above, the control device 70 of the present embodiment has an automatic cleaning function of cleaning the protective glass 44 while the processing is not being performed.

Incidentally, a trigger for starting the cleaning process may be performed automatically according to the schedule or may be configured such that the cleaning process is started by the operation of the user. Further, although the cleaning process is performed during the non-operating time, by setting the cleaning process for a predetermined time (for example, 40 minutes/times including the operation of equipment) at the switching work of the supply source of the workpiece W or the break time of the user (for example, a lunch break time for 45 minutes), it is possible to reduce the time for which the work cannot be performed by cleaning of the protective glass 44, and to further improve the operation rate.

According to the aforementioned present embodiment, the following effects are obtained. In the method for cleaning the optical component by UV ashing according to the present embodiment, while supplying the humidity-controlled humidified gas, ultraviolet rays are radiated to the surface of the protective glass 44 to remove organic matters on the surface of the protective glass 44. Therefore, it is possible to reliably generate OH radicals and stabilize the process of removing the organic matters on the surface of the optical component. In the UV ashing, oxygen molecules are decomposed into oxygen atoms by UV (185 nm), and collide with other gases to generate ozone. Next, when ozone is decomposed with UV (254 nm) to generate excited oxygen and react with water, OH radicals are generated, and the OH radicals oxidize the organic matters and discharge them as gases. However, in a state in which the amount of water is small, there is a risk that OH radicals are not generated and the detergency decreases (the UV ashing ability decreases). In this respect, according to the configuration of the present embodiment, since the humidity-controlled humidified gas (humidity-controlled air) is introduced into the laser head 40 when performing the UV ashing, the stable ashing is enabled without lowering the detergency.

Further, in the cleaning method of the present embodiment, the humidified gas is supplied so that the humidity in the laser head 40 during cleaning becomes 30% to 90%. This makes it possible to avoid a situation in which the humidity becomes 30% or less and the reaction time becomes extremely short. In addition, it is possible to prevent a degradation of a cleaning effect caused by the humidity inside the laser head 40 becoming 90% or more and occurrence by dew condensation of water in the humidified gas. It is possible to effectively prevent occurrence of a situation in which the cleaning effect is degraded or equipment failure occurs because the humidity is not in an appropriate range.

Further, in the method for cleaning the optical component according to the present embodiment, the temperature of the humidified gas is controlled to be equal to or lower than the temperature inside the laser head 40. Accordingly, it is possible to more effectively prevent the occurrence of dew condensation, by controlling and heating the water used for humidification so that the temperature is lower than or equal to the temperature inside the laser head 40 in anticipation of the latent heat of vaporization.

Further, in the method for cleaning the optical component according to the present embodiment, a cutting gas pipe 60 to which a cutting gas is supplied is connected to the laser head 40, a humidified gas pipe 110 for supplying the humidified gas is connected to the cutting gas pipe 60, after the end of the UV ashing, the supply of the humidified gas is stopped, and the cutting gas pipe is scavenged by the cutting gas. As a result, there is no need to separately provide piping for cleaning, and the configuration for cleaning and processing can be compactly assembled. As a result, it is possible to reliably prevent occurrence of a situation in which the cut surface is oxidized due to residual moisture of the cutting gas or cutting quality is deteriorated.

In addition, the humidified gas of the present embodiment is air containing oxygen. As a result, it is possible to stably perform decomposition treatment of organic matters by UV ashing by oxygen in the air contained in the humidified gas.

Further, the cleaning apparatus 5 for cleaning the protective glass 44 as the optical component of the laser processing machine 1 of the present embodiment includes an ultraviolet irradiation device 50 which is disposed on the side of the conveyor 10 and installed so that a laser beam axis 91 radiated from the laser head 40 and an ultraviolet beam axis 92 of the radiated ultraviolet ray are parallel to each other, and a humidifier 112 that supplies the humidified gas into the laser head 40. Also, the control device 70 that controls the laser processing machine 1 performs an irradiation control for controlling the laser moving device 20 to radiate the ultraviolet ray from the ultraviolet irradiation device 50 toward the protective glass 44 in a state of causing the ultraviolet irradiation port 51 to face the laser irradiation port 45 of the laser head 40, and a supply control for supplying the humidified gas into the laser head 40 by the humidifier 112 during the irradiation control. With this configuration, it is possible to restore the transmittance by removing contamination of the protective glass 44 without extracting from the main body 41 of the laser head 40. Therefore, the cleaning work of the protective glass 44 can be performed, using the non-operating time of the laser processing machine 1 during which the laser irradiation is not performed. Since the time required for the cleaning process of the protective glass 44 can be shortened considerably, it is not necessary to stop the operation of the laser processing machine 1, and the operation rate of the laser processing machine 1 can be improved.

Further, in the present embodiment, the ultraviolet irradiation device 50 radiates ultraviolet rays toward the protective glass 44 from the same position as the processing point P of the laser of the laser head 40 or a position closer to the protective glass 44 than that position. With this configuration, it is possible to reliably radiate ultraviolet rays over the entire range of the contamination of the protective glass 44 caused by the laser irradiation, and it is possible to further restore the transmittance.

Further, in the present embodiment, the laser head 40 has a cutting gas pipe 60 which supplies $N_2$ as a cutting gas to be injected toward the workpiece W together with the laser inside the laser head 40 at the time of processing, supplies $N_2$ at the time of laser irradiation, and stops the supply of the cutting gas at the time of ultraviolet irradiation. With this configuration, OH radicals are generated at the time of ultraviolet irradiation, oxidation and volatilization of organic matters can be promoted, and the cleaning effect can be further improved.

Further, in the present embodiment, oxygen is contained in the humidified gas as a cleaning gas. Therefore, active oxygen can be reliably present in the flow path 43, oxidation and volatilization of organic matters can be further promoted, a high cleaning effect can be realized at the time of ultraviolet irradiation, and it is possible to prevent entry of contaminants into the laser head 40 during cleaning.

Next, regarding the deposits of contamination of the protective glass 44, it was found from the analysis so far that the deposits are volatile substances of the rust preventive oil component applied to the surface of the workpiece W. Further, the adhesion range coincided with the optical path of the ultraviolet ray caused by the plasma generated at the processing point. Therefore, it is considered that the vapor of the rust preventive oil which entered the laser head 40 in a minute amount is deposited on the optical path of the ultraviolet ray from the processing point as a result of the light dust collection effect. The process of capable of decomposing and removing this type of contamination by ultraviolet irradiation is known as ultraviolet ashing such as a semiconductor process. That is, contamination of organic matter of the protective glass 44 caused by ultraviolet rays generated at the time of the laser processing is cleaned by ultraviolet irradiation of the ultraviolet irradiation device 50 radiated under the condition that no contamination is formed.

Figure 8:
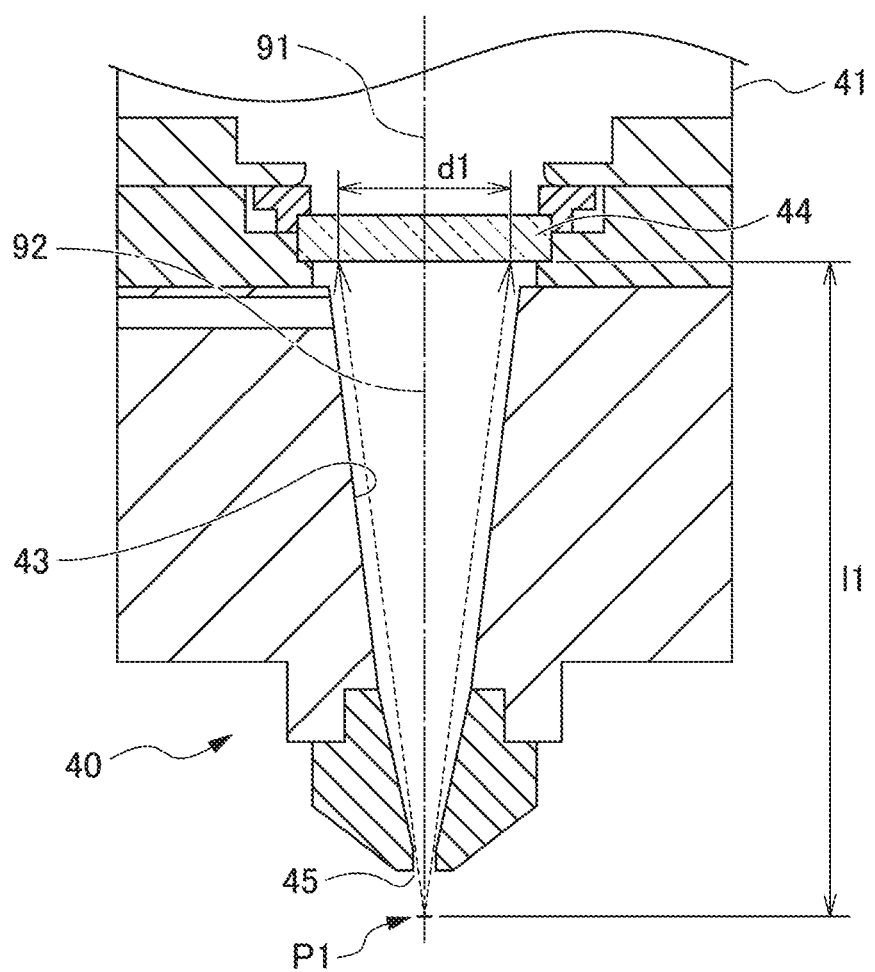
FIG. 8 is a schematic view illustrating an optical path in a case in which an optical path diameter is relatively small and the distance from the protective glass to the processing point is long, in the laser head of the present embodiment.
Figure 9:
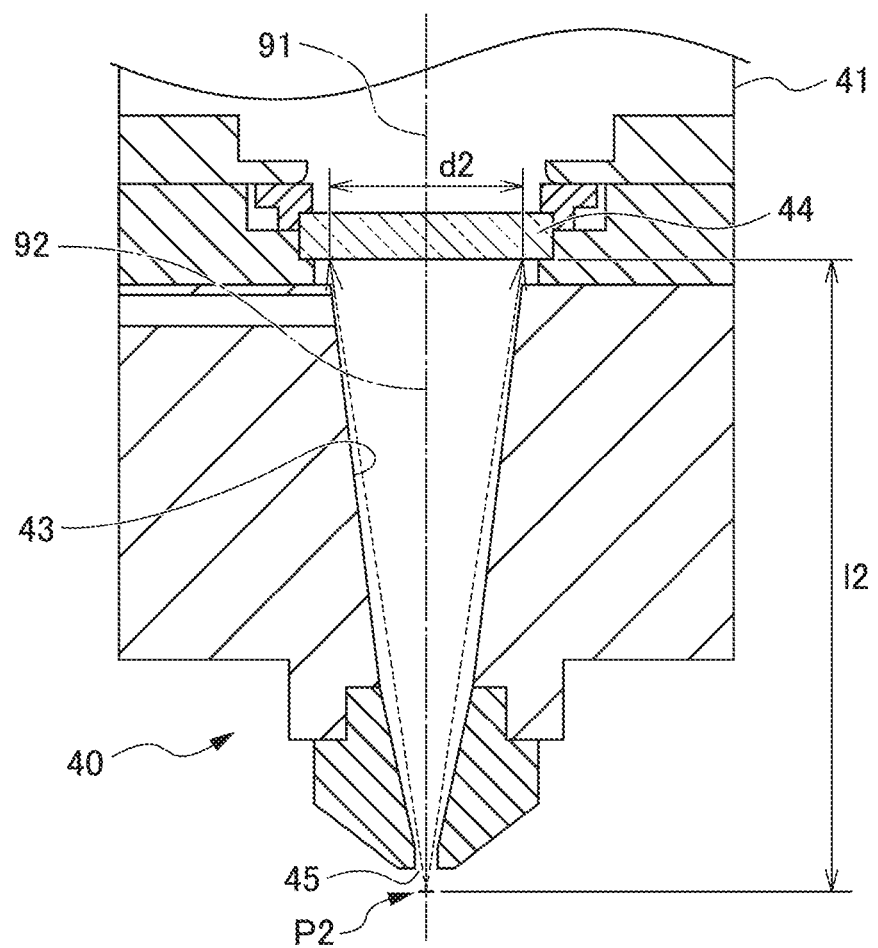
FIG. 9 is a schematic view illustrating an optical path in a case in which the optical path diameter is relatively large and the distance from the protective glass to the processing point is short, in the laser head of the present embodiment.

It is necessary for the ultraviolet irradiation device 50 to radiate ultraviolet rays so as to cover the range in which the contamination adheres. As described above, since the contamination diameter substantially coincides with the optical path diameter of the ultraviolet ray, as long as the position of the ultraviolet irradiation port 51 (an origin of ultraviolet ray) of the ultraviolet irradiation device 50 is located on the processing points P1 (in the case of FIG. 8) and P2 (in the case of FIG. 9) or on the side closer to the protective glass 44 than the processing points P1 and P2, ultraviolet rays can be radiated to cover the contamination range. That is, it is also proved from the examples of FIG. 8 and FIG. 9 that the entire adhesion range can be covered, by setting the cleaning position of the laser head 40 so that the ultraviolet irradiation port 51 of the ultraviolet irradiation device 50 is located at a position corresponding to the processing point P or a position on side closer to the protective glass 44 than that position at the time of processing of the laser processing machine 1.

Although preferred embodiments and examples of the present invention have been described above, the present invention is not limited to the above-described embodiments, and can be appropriately modified.

In the above embodiment, the ultraviolet irradiation device 50 is disposed on the side of the conveyor 10, but the configuration is not limited thereto. As long as the ultraviolet irradiation device 50 is at a position which the laser head 40 can be disposed to face, even in other places such as above the conveyor 10, the ultraviolet irradiation device 50 can appropriately change its place to be disposed.

In the above embodiments and examples, an example using a Yb fiber laser has been described, but the type of laser is not limited thereto. For example, the present invention can also be applied to remote laser welding. If plasma generation and organic fumes are present, organic matter adheres to the protective glass with antireflection coating formed by stacking several tens nm of films in multiple layers, and there is a risk that the antireflection function is impaired and the transmittance may be greatly deteriorated. If the present invention is applied to this type of laser processing machine, the transmittance of the protective glass can be kept equal to or greater than the reference, without lowering the operation rate.

EXPLANATION OF REFERENCE NUMERALS

1 Laser Processing Machine
5 Cleaning Apparatus
10 Conveyor (Workpiece Conveying Device)
11 Conveyor Drive Motor (Driving Mechanism)
20 Laser Moving Device (Moving Mechanism)
40 Laser Head
42 Focus Lens
44 Protective Glass (Optical Component)
45 Laser Irradiation Port
50 Ultraviolet Irradiation Device
51 Ultraviolet Irradiation Port
60 Cutting Gas Pipe
110 Humidified Gas Pipe
W Workpiece

What is claimed is:

1. A method for cleaning an optical component for removing organic matters on a surface of an optical component by UV ashing, the optical component being a protective glass disposed in a laser head irradiating a workpiece with a laser disposed between a focus lens focusing the laser and the workpiece, the cleaning method comprising:
   cleaning by UV ashing by radiating ultraviolet rays on the surface of the protective glass for a predetermined time while supplying humidity-controlled humidified gas to a flow path in the laser head so that the humidity inside the laser head becomes 30% to 90%; and
   purging with $N_2$ gas to the flow path and stopping supply of the humidified gas after an end of the cleaning.

2. The method for cleaning the optical component according to claim 1, wherein the humidified gas contains oxygen or air.

3. The method for cleaning the optical component according to claim 1, wherein supply pressure of the $N_2$ gas is set to be higher than supply pressure of the humidified gas.

4. The method for cleaning the optical component according to claim 1, wherein the temperature of the humidified gas is controlled to be equal to or lower than the temperature in the laser head.

5. The method for cleaning the optical component according to claim 4, wherein the humidified gas contains oxygen or air.

* * * * *